No. 618,132. Patented Jan. 24, 1899.
S. POWDRILL & W. C. PEET.
BALL BEARING.
(Application filed Jan. 28, 1898.)
(No Model.)
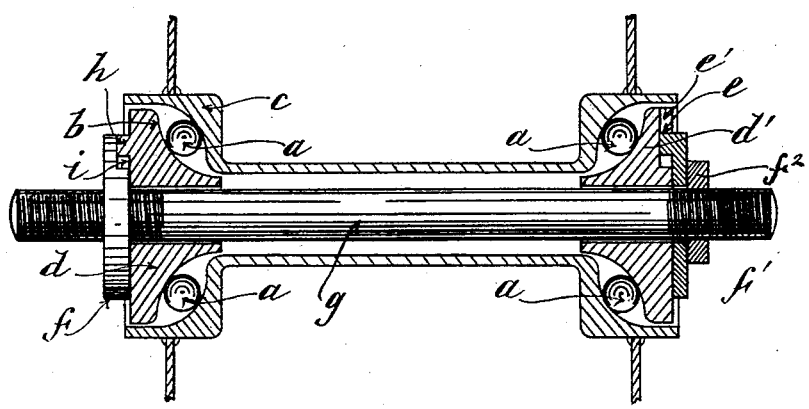
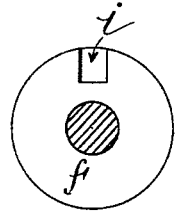 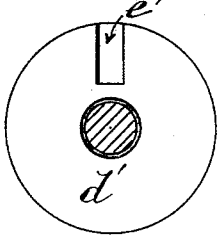 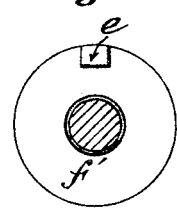
Witnesses.
Benjamin Clark.
Cecil Ford
Inventor.
Samuel Powdrill
William Charles Peet
per E. Eaton
Their Attorney.

United States Patent Office.

SAMUEL POWDRILL AND WILLIAM CHARLES PEET, OF FLECKNEY, ENGLAND.

BALL-BEARING.

SPECIFICATION forming part of Letters Patent No. 618,132, dated January 24, 1899.

Application filed January 28, 1898. Serial No. 668,310. (No model.)

*To all whom it may concern:*

Be it known that we, SAMUEL POWDRILL and WILLIAM CHARLES PEET, subjects of the Queen of Great Britain, and residents of Fleckney, in the county of Leicester, England, have invented certain new and useful Improvements in Ball-Bearings, of which the following is a full, clear, and exact specification.

This invention relates to improvements in ball-bearings for velocipedes and other wheels; and it consists in the use of cones, which are secured in position by means of lock-nuts which screw upon the spindle passing through the hub or the like. The ends of the cones are recessed and shaped so as to enable them to be secured without being screwed upon the spindle, the locking-nuts being provided with projections to engage in the recesses aforesaid.

In order that our invention may be fully understood, we will now refer to the annexed drawings, in which—

Figure 1 is a longitudinal section of a ball-bearing constructed according to our invention; Fig. 2, an elevation of the collar $f$, showing the recess $i$; Fig. 3, an elevation of the cone $d'$, showing the recess $e'$; Fig. 4, an elevation of the locking-collar $f'$.

The balls $a$ bear upon the cone-surfaces $b$ and the hub $c$. The cone $d$ is provided with a projection $h$, which engages in a corresponding recess $i$, formed in the collar $f$ upon the spindle $g$. The cone $d'$ is provided with a recess $e'$, which engages upon a corresponding projection in the collar $f'$, which is secured by means of the locking-nut $f^2$. By this means the cones may be adjusted upon the spindle without the necessity of providing them with threads for engaging upon screw-threads upon the spindle.

Having thus described our invention, what we claim, and desire to secure by Letters Patent, is—

In ball-bearings for velocipedes of the class herein described in combination; a spindle having a collar, there being a recess in said collar; a cone having a projection for engagement in said recess, said cone having a ball-race; a cone having a recess, a collar having a projection adapted to engage in the recess in the last-mentioned cone; a lock-nut screwed or threaded upon the spindle aforesaid; a hub having ball-races adapted to engage with balls carried on the ball-races on the cones aforesaid substantially as described and illustrated herein.

In testimony that we claim the foregoing we have hereunto set our hands this 13th day of November, 1897.

SAMUEL POWDRILL.
WILLIAM CHARLES PEET.

Witnesses:
FRED FELLOWES WIGGINS,
WALKER SAML. SAVIGE.